N. L. OLSON.
VEHICLE WHEEL.
APPLICATION FILED JAN. 24, 1917.

1,243,863.

Patented Oct. 23, 1917.
3 SHEETS—SHEET 1.

Witnesses
Arthur F. Draper
Karl H. Butler

Inventor
Nels L. Olson
By Bartlett & Bartlett
Attorneys

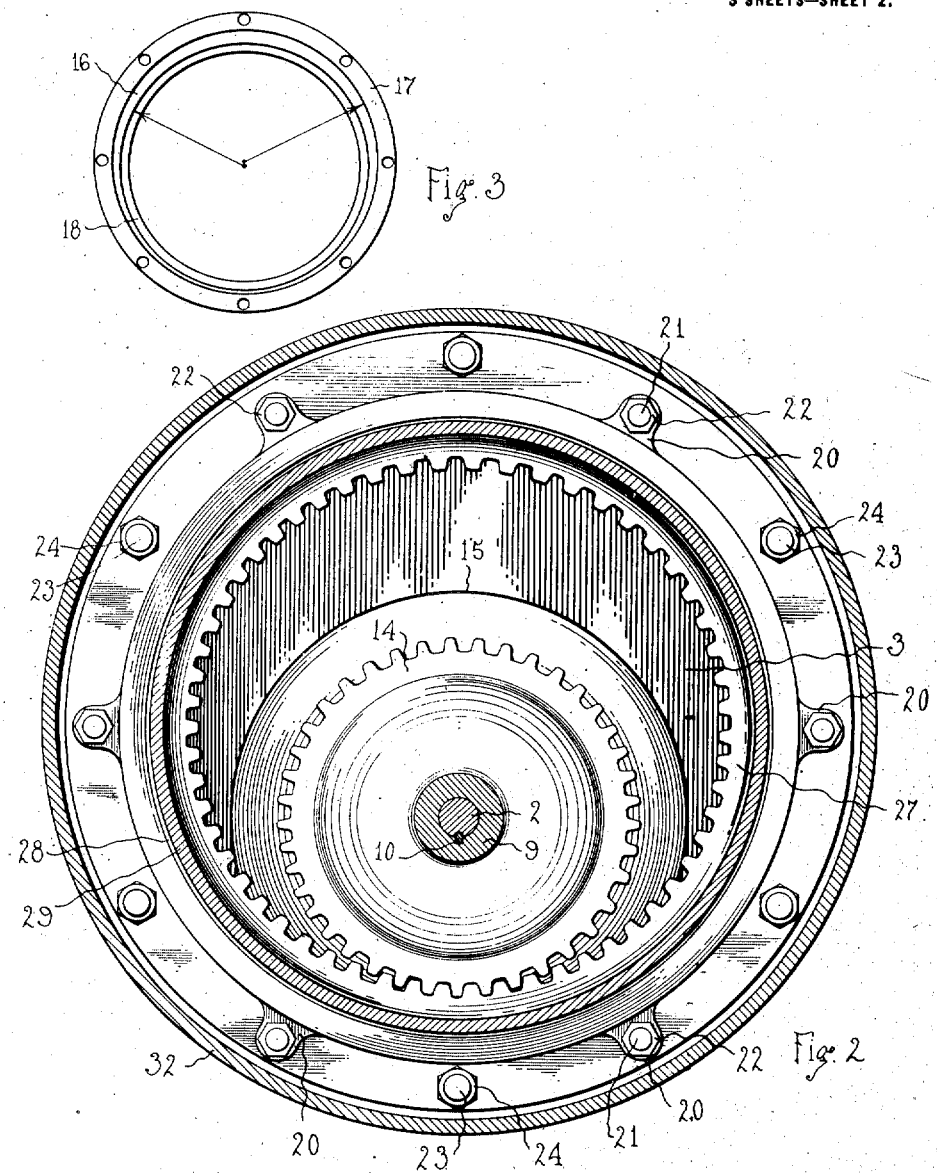

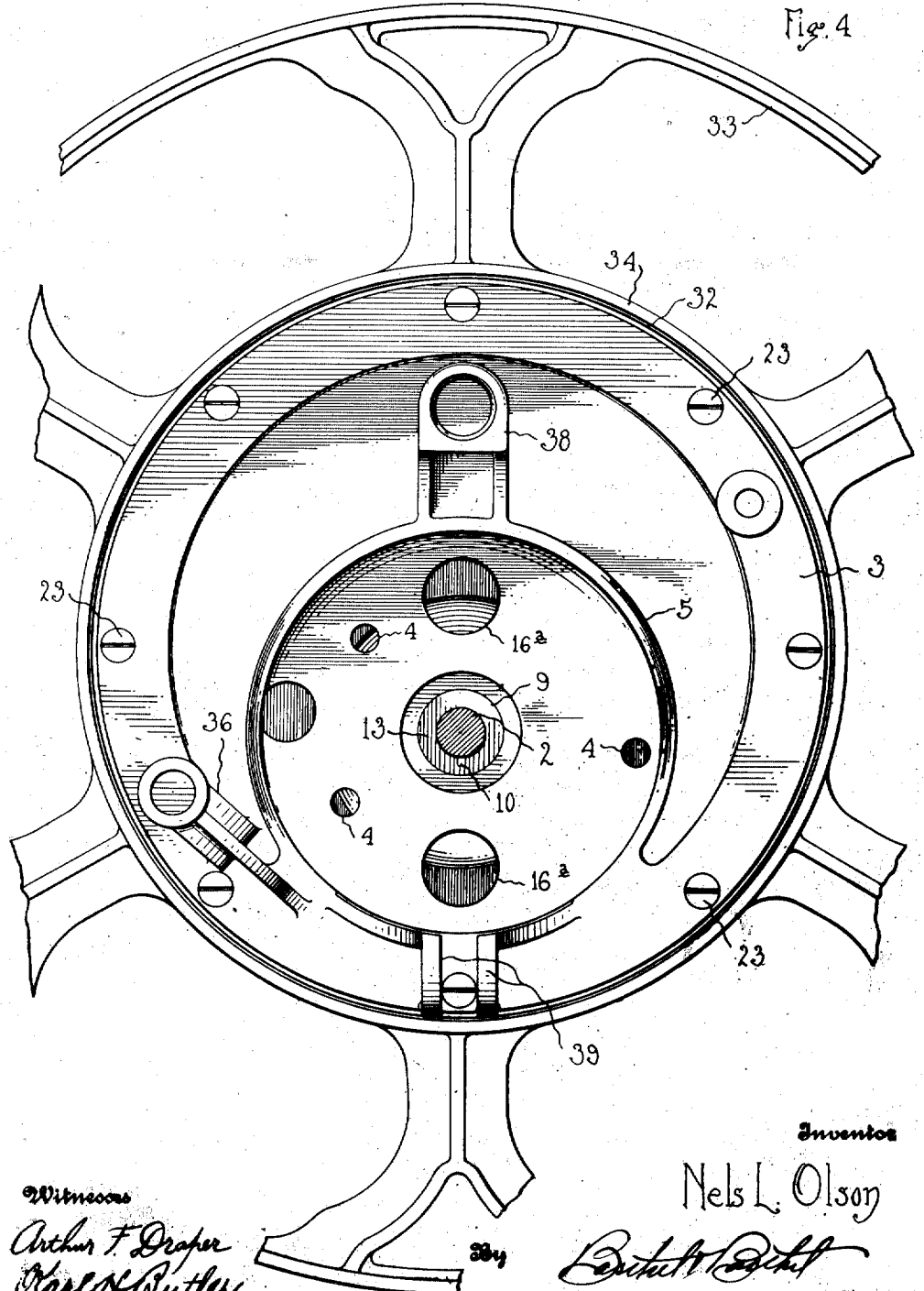

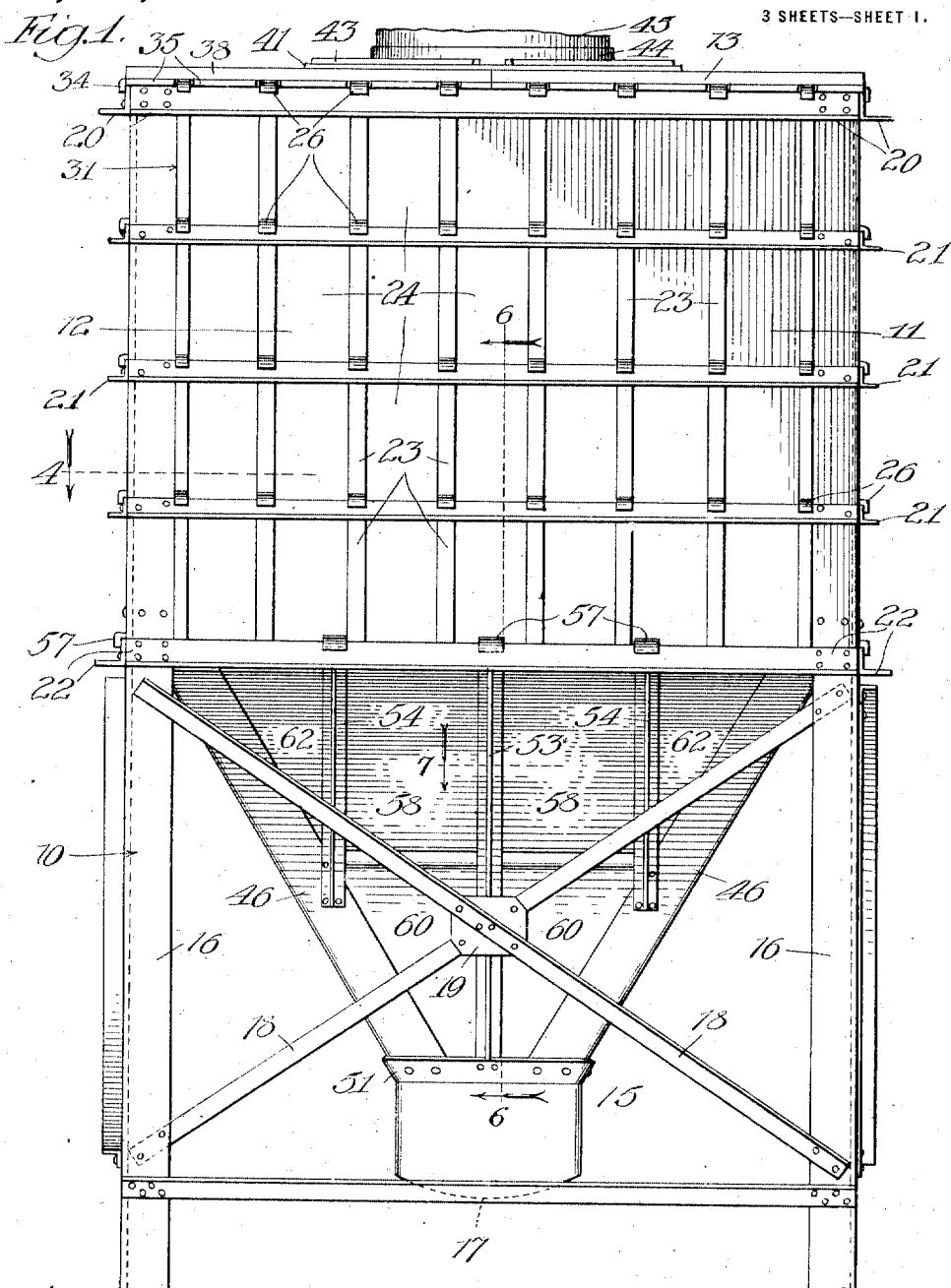

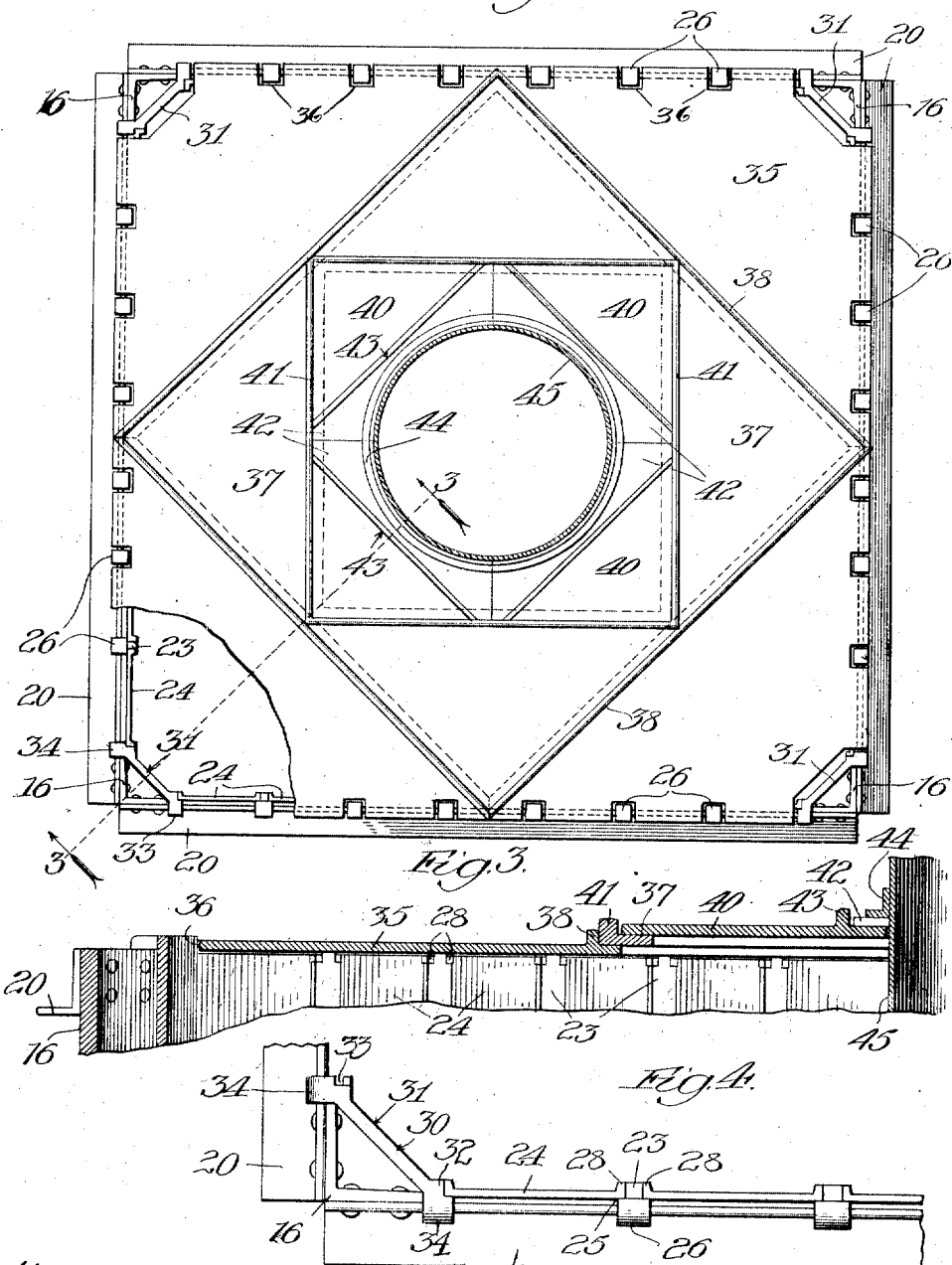

UNITED STATES PATENT OFFICE.

NELS L. OLSON, OF DETROIT, MICHIGAN.

VEHICLE-WHEEL.

1,243,863.

Specification of Letters Patent.

Patented Oct. 23, 1917.

Application filed January 24, 1917. Serial No. 144,176.

*To all whom it may concern:*

Be it known that I, NELS L. OLSON, a citizen of the United States of America, residing at Detroit, in the county of Wayne and State of Michigan, have invented certain new and useful Improvements in Vehicle-Wheels, of which the following is a specification, reference being had therein to the accompanying drawings.

This invention relates to vehicle wheels, and has special reference to a wheel which permits of a pleasure vehicle being converted into a commercial vehicle, for instance, by providing the chassis of a pleasure car with a truck or commercial body and substituting low speed wheels for the usual pneumatic tire wheels of the pleasure car.

My invention also has special reference to that type of vehicle wheel provided with an internal gear or rack driven by a pinion, so that the speed of the wheel will be materially reduced relative to its driving means.

The invention so far classified is characterized in the following particulars.

First, vehicle wheels in accordance with my invention having the treads or peripheries thereof eccentric relative to the driving axle of a vehicle with a direct drive from the axle disposed so that no part of a load on the wheels is transferred to the axle, thus leaving the axle free as a driving member for transmitting power.

Second, utilizing an internal gear drive for an ordinary vehicle axle without resorting to additional axles or jack shafts, thus permitting of my improved wheels being easily and quickly installed for commercial or truck service in connection with cars ordinarily employed for pleasure purposes. As an instance of this there might be cited the conversion of an ordinary "Ford" chassis into a one ton truck.

Third, the provision of novel means for compensating for wear between the driving pinion and the internal gear of such a driven wheel. It is essential for a noiseless internal gear driven wheel that the driving pinion and internal gear mesh perfectly, that is, the distance between the centers of these gears must be accurate. If this distance is too small the gears will bind entailing a loss of power due to friction and if the center distance is too great there will be lost motion and consequently noise in operation. It is therefore desirable to be able to adjust the center distance to take up lost motion and wear in service, also to care for imperfections in the manufacture of the internal drive mechanism.

The adjustment of centers in connection with my speed gear reduction is accomplished by mounting the internal gear or rack so that it may be repeatedly shifted and thus insure a perfect mesh between the internal gear and its driving pinion.

Fourth, a wheel construction having a housing applicable to an ordinary axle housing and including means whereby the usual service brake mechanisms may be utilized in connection with the wheels.

Fifth, a wheel construction consisting of parts constructed and assembled to exclude dust and other foreign matter from the driving mechanism of the wheel, and provision is made to reduce friction to a minimum and insure easy riding of a vehicle equipped with the wheels.

The invention as above characterized possesses many advantages other than those above enumerated, which will be apparent to those familiar with wheel construction, particularly the Olson method of converting pleasure cars for commercial purposes.

My invention will be hereinafter specifically described and then claimed and reference will now be had to the drawings, wherein—

Fig. 2 is a longitudinal sectional view taken on the line II—II of Fig. 1, looking in the direction of the arrows;

Fig. 3 is an elevation, on a reduced scale of an adjustable outer ball race member, and Fig. 4 is a view of the inner side of the wheel shown in Fig. 1, showing the vehicle axle in section.

Figure 1:
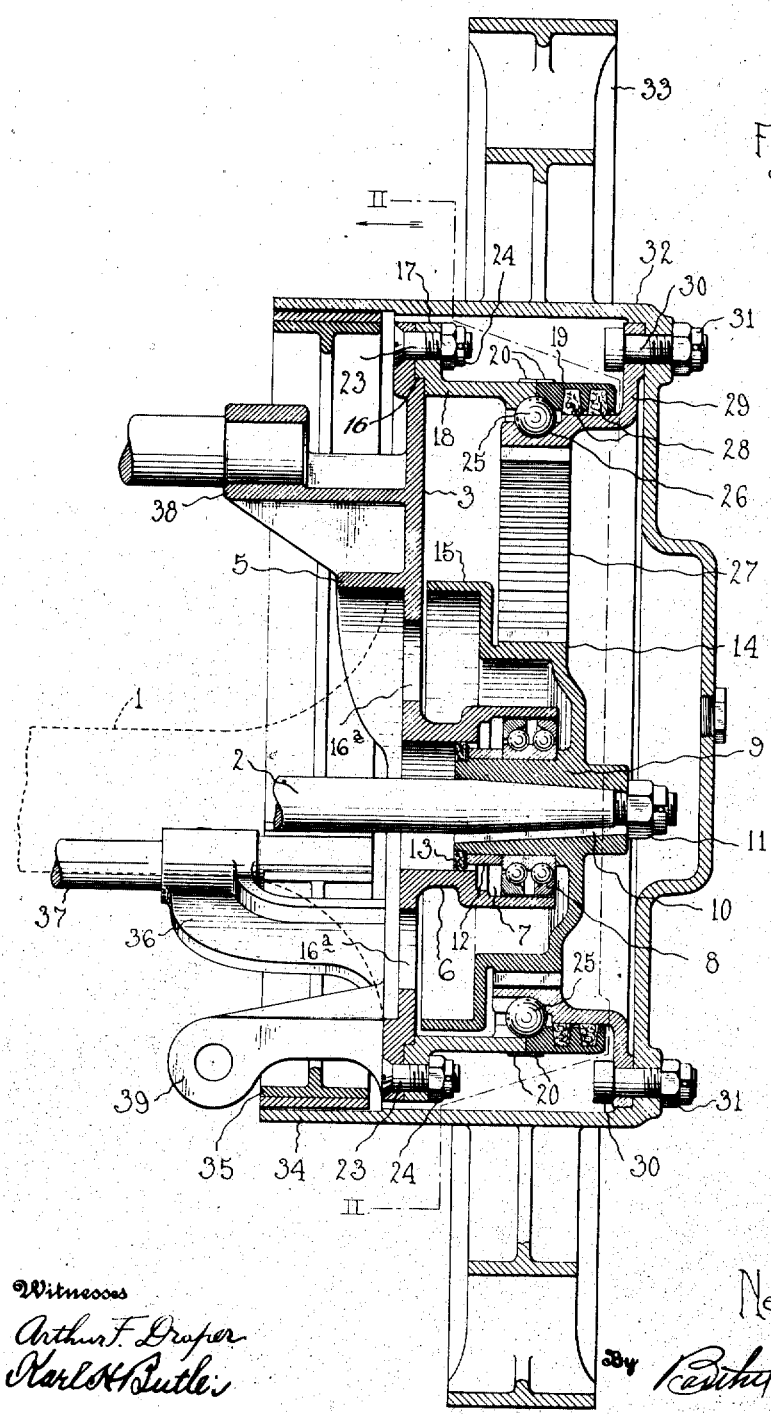
Figure 1 is a vertical sectional view of a vehicle wheel in accordance with my invention.

In describing my invention by aid of the views above referred to, I desire to point out that the same are intended as merely illustrative of the wheel as now constructed and I do not care to confine my invention to the precise construction and arrangement of parts shown. The following description is therefore to be broadly construed as including such substitute constructions and arrangement of parts as are the obvious equivalent of those to be hereinafter referred to.

In the drawings 1 denotes an axle housing and protruding from the end thereof is a driven axle 2 on which is ordinarily mounted a vehicle wheel. Mounted on the end of the axle housing 1 is a face plate 3 which may be connected to the end of the axle housing by suitable fastening means extending through openings 4 provided therefor in the face plate 3. Coöperating with the means of fastening the face plate in sustaining the same relative to the axle housing is a circumferential flange 5 that engages the upper and side edges of the axle housing 1, as shown in Figs. 1 and 4.

Protruding from the outer side of the face plate 3 and providing clearance for the axle 2 is a hub casing 6 having the outer end thereof recessed, as at 7, to receive an assembled anti-frictional bearing 8 for a pinion hub 9, which is fixed upon the end of the axle 2, for instance by a spline 10 and a nut 11. The hub 9 is of greater length than the bearing 8 or the recess 7 and accommodates a locking ring 12 and a dust or packing ring 13. The bearing 8 tends to relieve the axle from end thrust and since said bearing is of a less length than the recess 7, it is possible to use different sizes of locking rings 12 and thereby compensate for any manufacturing inequalities that may be encountered in the relation of the end of the axle housing 1 to the tapered end of the axle 2. It is therefore possible to correctly position the hub 9 with relation to the face plate 3.

The hub 9 has a concentric pinion 14 and a service brake drum 15, the latter being in proximity to the face plate 3, which is provided with openings 16ᵃ so that an expansible brake band or similar braking mechanism, operable from the driver's seat of the vehicle, may be used for controlling the operation of the vehicle wheel.

The face plate 3 has the periphery thereof provided with an eccentric seat 16 for the peripheral flange 17 of an outer ball race member composed of sections 18 and 19 having apertured ears 20 connected by bolts 21, nuts 22 or similar fastening means. The peripheral flange 17 is connected to the face plate 3 by screw bolts 23 and nuts 24, so that the outer ball race member 18 may from time to time be adjusted upon the seat 16. It is only necessary to remove the bolts and nuts and rotate the outer ball race member, for instance one-eighth of a revolution, if eight bolts are provided, in order to change the axis of the ball race member relative to the axis of the hub casing 6. This is best shown in Fig. 3 where the different centers will be noted, and the purpose of this adjustment will presently appear.

The outer ball race member has anti-frictional balls 25 engaging in the peripheral race 26 of an internal gear 27, said gear having the lower part thereof meshing with the under side of the pinion 14, as best shown in Fig. 2. By having the outer section 19 of the outer ball race member detachable relative to the section 18, the anti-frictional balls 25 can be readily assembled, besides the outer section 19 constitutes a holder for dust excluding packing rings 28 engaging an angle flange 29 carried by the outer side of the internal gear 27.

Before further describing my invention, I desire to direct attention to the adjustability of the internal gear 27 relative to the pinion 14. The meshing of the internal gear and pinion must be accurate to avoid friction, lost motion and noise, and since the center of the internal gear can be adjusted relative to the center of the face plate 3, it is obvious that a partial rotation of the outer ball race member will carry the teeth of the internal gear into greater or less intimate relation to the teeth of the pinion as occasion may require. It is therefore possible to compensate for imperfection in the manufacture of the reduction gear mechanism and to compensate for wear whenever the same is discovered.

Connected to the angle flange 29 of the internal gear by screw bolts 30, nuts 31 or other fastening means, is the housing or hub 32 of a road wheel 33. The housing or hub 32 incloses the outer ball race member and the face plate 3 and projects inwardly to provide an emergency brake drum 34. Operable in this emergency brake drum is the usual brake band or shoe 35, and the face plate 3 has a bracket or bearing 36 for the usual operating mechanism 37 employed for controlling the emergency brake mechanism.

The face plate 3 has two more brackets 38 and 39. The bracket 38 supports a vehicle body or frame relative to the chassis, either direct or through the medium of a spring suspension, and the load incurred by the vehicle body or its contents is transferred to the face plate 3, outer ball race member to the internal gear 27 and housing or hub 32 of the road wheel 33. The load is therefore applied directly to the road wheel thus relieving the axle shaft 2 of any stresses or strains, other than furnishing the drive to the road wheel. Lateral thrust that may be thrown on to the road wheel when rounding a curve or when driving on uneven ground is taken up by the anti-frictional bearings 25 and transmitted to the face plate 3, thus relieving the axle shaft 2 of any end thrust.

The bracket 39 permits of the usual transverse member connecting the face plates 3 at the ends of the axle housing 1.

From the foregoing, it will be noted that while the anti-friction bearing 8 is floating or adjustable to take care of variations in the lengths of axle shafts, that it is in a vertical plane with the anti-frictional bearing of the internal gear, and that the anti-frictional bearing 8 will take up lateral stresses due to thrust from the gear teeth, and therefore, the axle shaft is only subjected to torsional stresses, thus preventing a possible breaking of the axle.

What I claim is:—

1. The combination of an axle housing, an axle, a road wheel a reduction gear between said axle and said road wheel and including an internal gear, and a bearing member for said internal gear supported from said axle housing adapted for adjustment so that its center may be radially shifted relative to the center of said axle to compensate for imperfections of said reduction gear mechanism.

2. The combination of an axle housing, a face plate carried thereby, an axle, a road wheel, a reduction gearing between said axle and said road wheel and including an internal gear, and a bearing member supported by said face plate and having an eccentric adjustment relative thereto so that said internal gear may be adjusted relative to the remaining parts of said reduction gear mechanism.

3. The combination with an axle housing and an axle protruding therefrom, of a face plate connected to said axle housing, a bearing carried by said face plate, a road wheel having a portion thereof in said bearing member, a reduction gear mechanism between said axle and the portion of said road wheel in said bearing member, and means providing an adjustment of said bearing member to compensate for imperfections of said reduction gear mechanism.

4. In a vehicle wheel having a reduction gear mechanism, a hub casing, a pinion having a hub in said casing, an internal gear carried by said wheel and meshing with said pinion, and adjustable means for supporting said internal gear so that said internal gear may be adjusted for proper mesh with said pinion.

5. In a vehicle wheel, having a reduction gear mechanism, a hub casing, a pinion having a hub in said casing, an anti-frictional bearing between said casing and the hub of said pinion, an internal gear carried by said wheel and meshing with said pinion, adjustable means supporting said internal gear so that said internal gear may be adjusted for proper mesh with said pinion, and an anti-frictional bearing between said adjustable means and said internal gear.

6. In a vehicle wheel, a fixed face plate, an eccentrically disposed hub casing carried thereby, a pinion having a hub in said casing and a brake drum around said casing, an internal gear carried by said wheel and meshing with said pinion, and adjustable means carried by said face plate and supporting said internal gear so that said internal gear may be adjusted for proper mesh with said pinion.

7. In a vehicle wheel having a reduction gear mechanism, a fixed face plate, a hub casing eccentrically thereof, a pinion having a hub extending in said hub casing, a brake drum surrounding said casing, an internal gear carried by said wheel and meshing with said pinion, means supported eccentrically of said face plate and supporting said internal gear in mesh with said pinion, and an anti-frictional bearing between said means and said internal gear.

8. The combination with an axle housing and an axle protruding therefrom, of a face plate connected to said housing and eccentrically disposed relative thereto, a hub casing carried by said face plate, a pinion having a hub extending into said hub casing, and anti-frictional bearing in said hub casing on the hub of said pinion, an adjustable bearing member carried by said face plate, an internal gear rotatable in said bearing member and meshing with said pinion, and a road wheel carried by said gear.

9. The combination with an axle housing and an axle protruding therefrom, of a face plate connected to said housing and eccentrically disposed relative thereto, a hub casing carried by said face plate, a pinion having a hub extending into said hub casing, an anti-frictional bearing in said hub casing on the hub of said pinion, an adjustable bearing member carried by said face plate, an internal gear rotatable in said bearing member and meshing with said pinion, a road wheel carried by said gear, and a housing forming part of said wheel and providing a brake drum at the inner side of said face plate.

10. The combination with an axle housing and an axle protruding therefrom, of a face plate connected to said axle housing, a hub casing carried by said face plate, a pinion having a hub on said axle in said hub casing, an anti-friction bearing between said pinion hub and said hub casing, a brake drum carried by said pinion at the outer side of said face plate, a bearing member carried by said face plate, and a road wheel having an internal gear revoluble in said bearing member and meshing with said pinion.

11. The combination with an axle housing and an axle, of a face plate carried by said axle housing, a hub casing carried by said face plate, a pinion having a hub on said axle in said hub casing, a brake drum at the outer side of said face plate, an adjustable bearing member carried by said face plate, an internal gear revoluble in said bearing member and meshing with said pinion, and a road wheel having a housing connected to said gear and inclosing said bearing member and providing a brake drum at the inner side of said face plate.

12. In a vehicle wheel, an axle, a face plate disposed eccentrically thereof, a bearing member having an eccentric adjustment on said face plate so that the center of said bearing member may be adjusted relative to the center of said axle, a road wheel, and a reduction gearing between said axle and said road wheel and housed within said bearing member.

13. In a vehicle wheel, an axle, a face plate eccentrically disposed thereto, a bearing member on said face plate capable of being adjusted so its center may be shifted relative to the center of said axle, a road wheel, a housing carried thereby and inclosing said bearing member and said face plate and providing a brake drum at the inner side of said face plate, and a reduction gearing in said housing and the bearing member so that said axle may drive said road wheel at a reduced speed.

14. The combination with an axle housing, an axle in the housing, a bearing interposed between the end of the axle and the housing to support the axle therein, a wheel eccentrically disposed relative to the axle and its bearing, a bearing carried by the housing in the vertical plane of said wheel and concentrically of said wheel to transmit load directly from the housing to the wheel, and means for transmitting motion from the end of the axle to the wheel.

15. The combination of a road wheel having a concentric housing, an internal gear carried thereby, a bearing member independent of said housing supporting said internal gear, means eccentrically disposed relative to said bearing member and supporting said member, and means operable eccentrically of the last mentioned means adapted to impart movement to said internal gear.

In testimony whereof I affix my signature in the presence of two witnesses.

NELS L. OLSON.

Witnesses:
 ANNA M. DORR,
 LEWIS E. FLANDERS.